(12) United States Patent
Dackefjord et al.

(10) Patent No.: US 11,071,082 B2
(45) Date of Patent: Jul. 20, 2021

(54) SECONDARY NODE, A CENTRAL NODE AND METHODS THEREIN FOR POSITIONING OF A DEVICE IN A WIRELESS COMMUNICATIONS NETWORK

(71) Applicant: NIDA TECH SWEDEN AB, Malmö (SE)

(72) Inventors: Håkan Dackefjord, Älvsjö (SE); Warwick Taws, Bromma (SE); Alexander Mruga, Malmö (SE)

(73) Assignee: NIDA TECH SWEDEN AB, Malmö (SE)

(*) Notice: Subject to any disclaimer, the term of this patent is extended or adjusted under 35 U.S.C. 154(b) by 0 days.

(21) Appl. No.: 16/628,377

(22) PCT Filed: Jun. 25, 2018

(86) PCT No.: PCT/SE2018/050680
§ 371 (c)(1),
(2) Date: Jan. 3, 2020

(87) PCT Pub. No.: WO2019/009787
PCT Pub. Date: Jan. 10, 2019

(65) Prior Publication Data
US 2020/0221411 A1    Jul. 9, 2020

(30) Foreign Application Priority Data
Jul. 7, 2017    (SE) .................... 1750898-7

(51) Int. Cl.
*G01S 13/87*    (2006.01)
*H04W 64/00*    (2009.01)
*G01S 5/02*    (2010.01)

(52) U.S. Cl.
CPC ......... *H04W 64/003* (2013.01); *G01S 5/0289* (2013.01); *G01S 13/878* (2013.01)

(58) Field of Classification Search
CPC ... H04W 64/003; H04W 84/02; H04W 84/18; H04W 64/00; H04W 74/04;
(Continued)

(56) References Cited

U.S. PATENT DOCUMENTS

| 2009/0149198 A1 | 6/2009 | Nam et al. |
| 2010/0177681 A1 | 7/2010 | Sahinoglu |

(Continued)

*Primary Examiner* — Joseph E Dean, Jr.
(74) *Attorney, Agent, or Firm* — Duane Morris LLP; Gregory M. Lefkowitz; Joaquin Hernandez (57) ABSTRACT

A method performed by a secondary node for enabling positioning of a device in a wireless communications network. First, the secondary node receives a positioning data packet from a primary node to the device. The secondary node then determines the transmitting time of the positioning data packet based on the reception time of the positioning data packet in the secondary node and the position of the primary node and the secondary node. The secondary node also receives a request response from the device to the primary node. The secondary node then enables positioning of the device based on the determined transmitting time of the positioning data packet and the reception time of the received request response. A secondary node for enabling positioning of a device in a wireless communications network is also provided. Furthermore, a central node and a method therein for positioning a device in a wireless communications network are also provided.

25 Claims, 4 Drawing Sheets

(58) Field of Classification Search
CPC ........ G01S 5/0289; G01S 13/878; G01S 5/06; G01S 5/0295; G01S 5/02
See application file for complete search history.

(56) References Cited

U.S. PATENT DOCUMENTS

| | | |
|---|---|---|
| 2011/0007650 A1* | 1/2011 | Nam .................. G01S 5/14 370/252 |
| 2012/0252503 A1 | 10/2012 | Wu |
| 2016/0282448 A1 | 9/2016 | Sen et al. |
| 2017/0269190 A1* | 9/2017 | Henriksson .......... H04W 64/00 |
| 2018/0146082 A1* | 5/2018 | Adel .................... H04W 4/023 |

* cited by examiner

SECONDARY NODE, A CENTRAL NODE AND METHODS THEREIN FOR POSITIONING OF A DEVICE IN A WIRELESS COMMUNICATIONS NETWORK

CROSS-REFERENCE TO RELATED APPLICATIONS

This application is a § 371 national stage entry of International Application No. PCT/SE2018/050680, filed Jun. 25, 2018, which claims priority of Sweden National Application No. 1750898-7 filed Jul. 7, 2017, the entire contents of which are incorporated herein by reference.

TECHNICAL FIELD

Embodiments herein relate to positioning in wireless communications network. In particular, embodiments herein relate to a secondary node and method therein for enabling positioning of a device in a wireless communications network. Also, embodiments herein relate to a central node and method therein for positioning a device in a wireless communications network.

BACKGROUND

Positioning of a device, such as, e.g. wireless device, mobile device, or user equipment, in a wireless communications network, such as, e.g. networks under the 802.11x Wi-Fi standard, Bluetooth standard, 802.15x Zigbee standard, or any other suitable wireless communications network, may conventionally be based on so-called Round Trip Time, RTT, measurements. The RTT between a node and a device in a wireless communications system may be measured as the time from transmission of a request signal from the node to the device up until a response signal from the device is received back at the node. The RTT may then be used to determine a distance between the node and the device. Unfortunately, the RTT will also comprise an unknown processing time/time delay in the device after first receiving the request signal from a node and before a response signal is sent back to the node. This processing time is usually non-deterministic and may vary significantly between different devices, for example, due to the current work load of the processor therein. This will lead poor precision in the determination of a distance between the node and the device.

Another way of determining a distance between a node and a device in a wireless communications network is to exclude the processing time in the device by measuring only the one-way Time of Flight, ToF, between the node and the device. However, this requires that the same time base is used at both the node and the device, and achieving a mutual time base in a node and a device require some form of clock synchronization between the node and the device.

Furthermore, no matter if RTT or one-way ToF is used for determining the distance between a node and a device for the purpose of obtaining the position of a device in a wireless communications network, there may also be restrictions in the wireless communications network that limits the number of transmissions, and/or on air time, that the nodes in the wireless communications network may perform. It follows that the number and/or length of possible request-response signal exchanges between a node and a device in the wireless communications network may be limited, or that the time or clock synchronization between a node and a device in the wireless communications network is not possible.

SUMMARY

It is an object of embodiments herein to improve the positioning of a device in a wireless communications network.

According to a first aspect of embodiments herein, the object is achieved by a method performed by a secondary node for enabling positioning of a device in a wireless communications network. The secondary node receives a positioning data packet from a primary node to the device. The secondary node also determines the transmitting time of the positioning data packet based on the reception time of the positioning data packet in the secondary node and the position of the primary node and the secondary node. The secondary node further receives a request response from the device to the primary node. Furthermore, the secondary node enables positioning of the device based on the determined transmitting time of the positioning data packet and the reception time of the received request response.

According to a second aspect of embodiments herein, the object is achieved by a secondary node for enabling positioning of a device in a wireless communications network. The secondary node is configured to receive a positioning data packet from a primary node to the device. The secondary node is also configured to determine the transmitting time of the positioning data packet based on the reception time of the positioning data packet in the secondary node and the position of the primary node and the secondary node. Further, the secondary node is configured to receive a request response from the device to the primary node. The secondary node is also configured to enable positioning of the device based on the determined transmitting time of the positioning data packet and the reception time of the received request response.

According to a third aspect of embodiments herein, the object is achieved by a method performed by a central node for positioning a device in a wireless communications network. The central node is configured to communicate with two or more nodes in the wireless communications network. The central node selects a primary node of the two or more nodes to transmit a positioning data packet to the device. The central node also receives timing information from the two or more nodes based on the positioning data packet transmitted by the selected primary node and a request response from the device to positioning data packet transmitted by the selected primary node. Further, the central node determines the position of the device based on the received timing information.

According to a fourth aspect of embodiments herein, the object is achieved by a central node for positioning a device in a wireless communications network. The central node is configured to communicate with two or more nodes in the wireless communications network. The central node is configured to select a primary node of the two or more nodes for transmitting one or more positioning data packets to the device. The central node is also configured to receive two or more transmission times between the two or more nodes and the device based on the one or more positioning data packets transmitted by the selected primary node. Further, the central node is configured to determine the position of the device based on at least the received two or more transmission times.

According to a, fifth aspect of embodiments herein, the object is achieved by a wireless communications network comprising at least one secondary node as described above, or comprising at least one secondary node as described above and a central node as described above.

According to a sixth aspect of embodiments herein, the object is achieved by a computer program, comprising instructions which, when executed on at least one processor, cause the at least one processor to carry out the method described above. According to a seventh aspect of embodiments herein, the object is achieved by a carrier containing the computer program described above, wherein the carrier is one of an electronic signal, optical signal, radio signal, or computer readable storage medium.

By having a secondary node in a, wireless communications network intercepting positioning data packets from a primary node to a device and having information about the currently fixed position of both the primary and secondary node, the secondary node is capable of determining the transmitting time of the positioning data packet from the primary node by subtracting the known time difference between the currently fixed positions of the primary and second node. This essentially achieves a synchronization of the primary and secondary node, at least in relative time, without having to conduct any actual time synchronization in the wireless communications network. Then, by receiving the request response from the device, the secondary node may enable the positioning of the device in the wireless communications network based on the determined transmitting time of the positioning data packet and the reception time of the request response. This may be performed either by forwarding these timing parameters, or determined timing information related thereto, to a central node for positioning of the device or by using these parameters itself in the secondary node in positioning of the device. This advantageously also reduces the number of transmissions, i.e. positioning data packet-request response exchanges, required to be transmitted in the wireless communications network since the secondary node may utilize the transmissions of the primary node. This advantage also increases with the number of secondary nodes in the wireless communications network. Hence, the signalling required when positioning of a device in a wireless communications network is reduced. Thus, positioning of a device in a wireless communications network is improved.

The term request response as used herein is in one embodiment a response to the positioning data packet sent to the device and the request response is transmitted from the device.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 1:
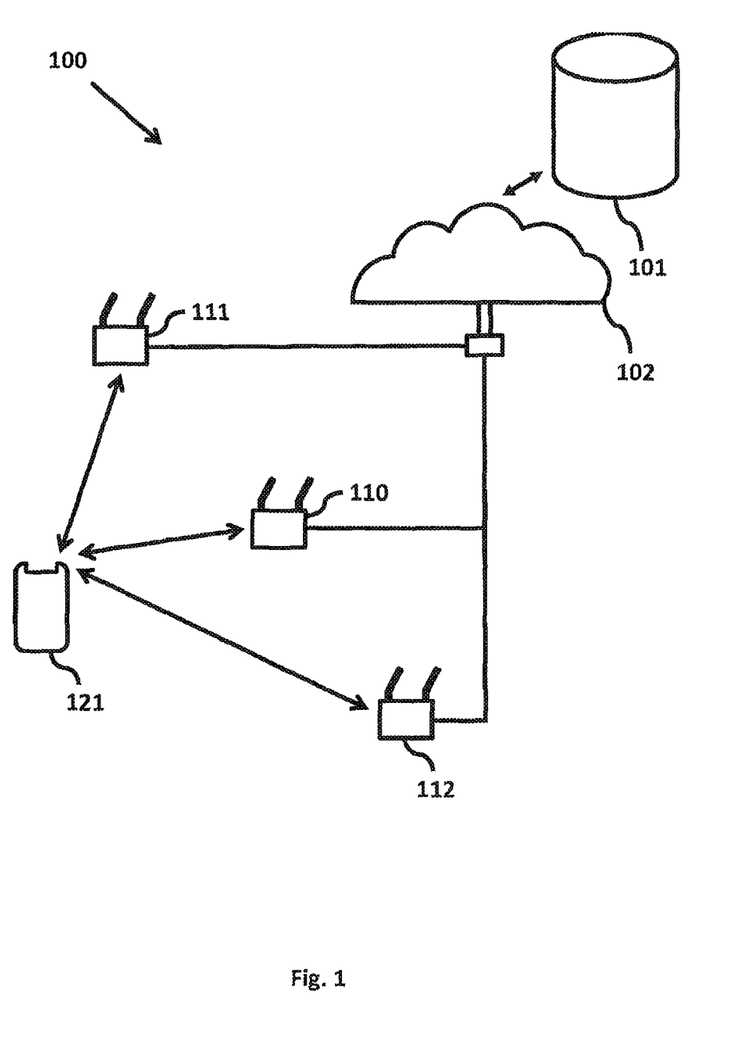
FIG. 1 is a schematic block diagram illustrating embodiments of a device, a central node, and secondary nodes in a wireless communications network.

FIG. 1 shows an example of a wireless communications network 100 in which embodiments herein may be implemented. It should be noted that the wireless communications network 100 may be a separate standalone wireless communications network dedicated to the positioning of a device, but may also be implemented using parts of a conventional wireless communications network or radio communication system, such as, New Radio (NR), Long Term Evolution (LTE), a LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB), GSM network, or other cellular network, or system or radio networks, such as, a future 5G wireless communication system.

In the example shown in FIG. 1, the wireless communications network 100 comprises a central node 101 that may be connected to and/or form a part of a cloud-based communication infrastructure 102 accessible via the Internet or similar communication networks. It should be noted that the cloud-based communication infrastructure 102 is merely one example of how the core part of the wireless communications network 100 may be implemented. Other solutions may include, for example, LANs/WANs, Local Area Networks or Wide Area Networks accessible via the Internet or similar communication networks. The central node 101, for example, a server or similar dedicated data processing unit, may be configured to communicate with one or more node or network nodes in the wireless communications network 100, such as, for example, the primary node 110 and secondary nodes 111, 112 as shown in the example in FIG. 1. Since the central node 101 may be used to determine the position of a device in the wireless communications network 100, the central node 101 may also be referred to as, for example, a positioning node, a positioning server or a positioning unit.

The primary node 110 and secondary nodes 111, 112 may be network nodes configured to communicate with a device 121 within an Industrial, Scientific and Medical (ISM) radio band and/or on a frequency between 300 MHz to 1000 MHz. Thus, the primary node 110 and secondary nodes 111, 112 are configured for wireless signalling with the device 121. Correspondingly, the device 121 may be a wireless device configured to communicate with the primary node 110 and secondary nodes 111, 112 within an Industrial, Scientific and Medical (ISM) radio band and/or on a frequency between 300 MHz to 1000 MHz. Thus, the device 121 are configured for wireless signalling with the primary node 110 and secondary nodes 111, 112. It should here be noted that the signalling between the primary node 110 and secondary nodes 111, 112 and the device 121 may be dedicated solely for the purpose of positioning the device 121 within the wireless communications network 100.

Furthermore, although embodiments below are described with reference to the scenario of FIG. 1, this scenario should not be construed as limiting to the embodiments herein, but merely as an example made for illustrative purposes. For example, the number of secondary nodes in the wireless communications network 100 may be any suitable number of nodes.

Figure 2:
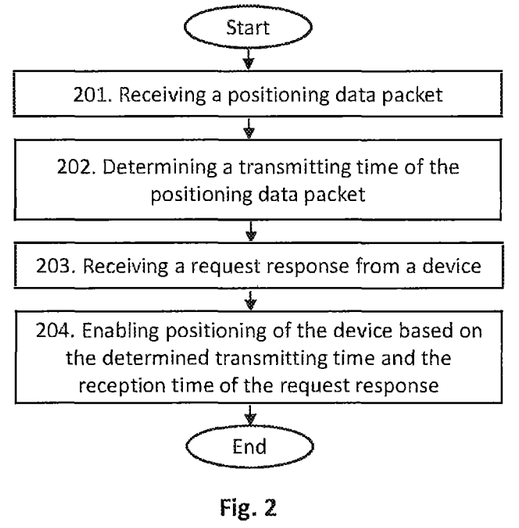
FIG. 2 is a flowchart depicting embodiments of a method in a secondary node.

Example of embodiments of a method performed by a secondary node 111, 112 for enabling positioning of a device 121 in a wireless communications network 100, will now be described with reference to the flowchart depicted in FIG. 2. FIG. 2 illustrates an example of actions or operations which may be taken by the secondary node 111, 112. The method may comprise the following actions.

Action 201

The secondary node 111, 112 receives a positioning data packet from a primary node 110 to the device 121. This means the secondary node 111, 112 intercepts a positioning data packet being transmitted from the primary node 110 to the device 121 in the wireless communications network 100. The positioning data packet may be a test signal or data packet, e.g. a so-called "ping" signal, carrying a no data payload, a data payload, or a reduced or minimized data payload. In one embodiment the data packet may comprise only enough information for the device 121 to respond with a request response. In one embodiment the data packet comprise enough information to identify the primary node 110 to the device 121. The positioning data packet may also, for example, be a Request-To-Send (RTS) message.

In some embodiments, the reception of the positioning data packet may be performed within an ISM radio band and/or on a frequency between 300 MHz to 1000 MHz. This means that the secondary node 111, 112 may be configured to communicate and operate in a low-frequency end of the frequency spectrum available for wireless communication.

In some embodiments, the reception of the positioning data packet may be performed within an ISM radio band and/or on a frequency between 1000 MHz to 10 000 MHz.

Action 202

After receiving the positioning data packet in Action 201, the secondary node 111, 112 determines the transmitting time of the positioning data packet based on the reception time of the positioning data packet in the secondary node 111, 112 and the position of the primary node 110 and the secondary node 111, 112. This means that the secondary node 111, 112 may use its own position and the position of the primary node 110 in order to determine when the positioning data packet was transmitted from the primary node 110 to the device 121. Since the propagation speed of radio waves and the positions of the primary node 110 and the secondary node 111, 112 are known, a time difference between the primary node 110 and the secondary node 111, 112 may be determined. This time difference may then, for example, be deducted or subtracted from reception time of the positioning data packet in the secondary node 111, 112 in order to determine the time that that the positioning data packet was transmitted from the primary node 110, i.e. the transmitting time of the positioning data packet.

According to some embodiments, the position of the primary node 110 and the secondary node 111, 112 are at least temporarily stationary and determined in the secondary node 111, 112. The primary node 110 and the secondary node 111, 112 may be network nodes that are permanently located at a specific location, i.e. stationary. However, the primary node 110 and the secondary node 111, 112 may also be network nodes that are movable or mobile, which means that the primary node 110 and the secondary node 111, 112 may change its location at different points in time. However, in this case, the primary node 110 and the secondary node 111, 112 may be assumed to be, at least temporarily, stationary and have fixed positions that are known in the secondary node 111, 112.

The positions of the primary node 110 and the secondary node(s) 111, 112 may in one embodiment be determined via positioning using radio technology as described herein. In another embodiment the positions for the primary node 110 and secondary node(s) 111, 112 might be determined via for example GPS. In yet another embodiment the positions might be fixed positions known to the nodes, either entered manually or known via for example a central node 101.

Action 203

The secondary node 111, 112 further receives a request response from the device 121 to the primary node 110. This means the secondary node 111, 112 further intercepts a request response being transmitted from the device 121 to the primary node 110 in the wireless communications network 100 in response to the earlier intercepted positioning data packet. Similar to the positioning data packet, the request response may also be a test signal or data packet carrying a no data payload or at least a reduced or minimized data payload, but enough information to identify the device 121 to the primary node 110. The request response may also be referred to as a "pong" signal, since it is transmitted in response to the positioning data packet, i.e. a "ping" signal. The request response may also, for example, be a Clear-To-Send (CTS) message. In some embodiments, the reception of the request response may be performed within an ISM radio band and/or on a frequency between 300 MHz to 1000 MHz. In some embodiments, the reception of the request response may be performed within an ISM radio band and/or on a frequency between 1000 MHz to 10 000 MHz.

Action 204

After receiving the request response in Action 203, the secondary node 111, 112 enables the positioning of the device 121 based on the determined transmitting time of the positioning data packet and the reception time of the received request response. In other words, the secondary node 111, 112 may, from the intercepted signalling between the primary node 110 and the device 121, register and obtain timing information that may be used to accurately determine the position of the device 121. This advantageously provides a way of using a single positioning data packet-request response exchange between a primary node 110 and a device 121, in order to effectively achieve similar result for all nodes in the wireless communications network 100 as if all of the nodes 110, 111, 112 where to perform a positioning data packet-request response exchange with the device 121 themselves.

In some embodiments, the secondary node 111, 112 may determine a transmission time between the secondary node 111, 112 and the device 121 based on the determined transmitting time of the positioning data packet and the received reception time of the request response. This means that the secondary node 111, 112 may determine a Time-of-Flight, ToF, or Time-Difference-of-Arrival, TDoA, measurement based on the determined transmitting time of the positioning data packet and the received reception time of the request response, i.e. the intercepted signals between the primary node 110 and the device 121. It should be noted that the RTT in this case originates from the primary node 110 and that it per definition might not be considered as RTT. I.e. the distance is measured from the primary node 110, via the device 121 to the secondary node 111, 112.

In some embodiments, the secondary node 111, 112 may transmit the determined transmitting time of the positioning data packet, the reception time of the received request response, and/or the determined transmission time to another node in the wireless communications network 100. This means that the secondary node 111, 112 may transmit the registered or obtained timing information associated with the intercepted signals between the primary node 110 and the device 121 to another node in the wireless communications network 100, such as, e.g. the central node 101. This registered or obtained timing information may then be used by another node in order to determine the position of the device 121 in the wireless communications network 100, for example, by determining the distance between the secondary node 111, 112 and the device 121.

Optionally, in some embodiments, the secondary node 111, 112 may receive at least one transmission time between the device 121 and another node in the wireless communications network 100. In this case, the secondary node 111, 112 may determine the position of the device 121 based on at least the received at least one transmission time and one or more of the determined transmitting time of the positioning data packet, the reception time of the received request response, and/or the determined transmission time. This means, for example, that instead of transmitting the registered or obtained timing information associated with the intercepted signals between the primary node 110 and the device 121 to e.g. the central node 101, the secondary node 111, 112 may receive timing information registered and obtained by other nodes in the wireless communications network 100, such as, for example, the primary node 110 or further possible secondary nodes in the wireless communications network 100. This enables the secondary node 111, 112 to determine the position of the device 121 in the wireless communications network 100, for example, by determining the distance between the device 121 and more than one node in the wireless communications network, e.g. the primary node 110 and the secondary nodes 111, 112. In some embodiments, after determining the position of the device 121 in the wireless communications network 100, the position of the device 121 may be transmitted to other nodes in the wireless communications network 100. This enables data processing or calculations involved in determining the position of the device 121 in the wireless communications network 100 to be distributed among the nodes in the wireless communications network 100.

In this case, according to some embodiments, the secondary node 111, 112 may determine the position of the device 121 further based on that the processing time in the device 121 from the reception of the positioning data packet to the transmitting of the request response is set and determined in the secondary node 111, 112. This means, for example, that the processing time in the device 121 may be assumed to be fixed and constant in the secondary node 111, 112. The processing time of the device 121 may, for example, be predefined, manually inputted or downloaded in the secondary node 111, 122.

It should also be noted that the positioning data packet-request response exchange, i.e. the transmissions of a positioning data packet and the corresponding request response, between the primary node 110 and the device 121 may, for example, be performed between 1-250 times. Consequently, the secondary nodes 111, 112 may also perform the inception of the positioning data packet and the request response up to an equal number of times. The number of iterations of the positioning data packet-request response exchange between the primary node 110 and the device 121 may, for example, be determined depending on the desired accuracy of the determination of the position of the device 121. For example, a distance between the device 121 and each of the primary node 110 and the secondary node 111, 112 may be determined for each positioning data packet-request response exchange. Average distances may then be determined based on the number of determined distances, wherein the average distances may be the once used in the end for determining the position of the device 121 in the wireless communications network 100.

Figure 3:
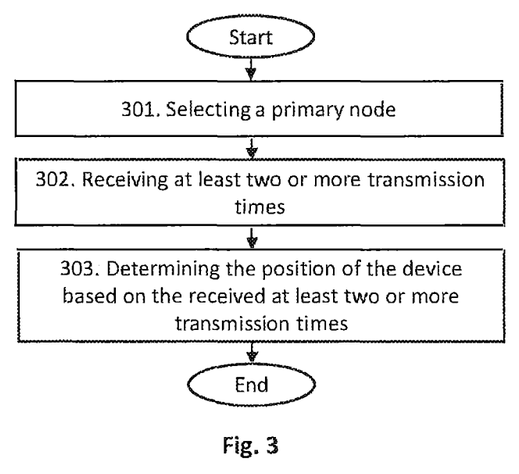
FIG. 3 is a flowchart depicting embodiments of a method in a central node.

Example of embodiments of a method performed by a central node 101 for positioning a device 121 in a wireless communications network 100, will now be described with reference to the flowchart depicted in FIG. 3. FIG. 3 illustrates an example of actions or operations which may be taken by the central node 101. The central node 101 being configured to communicate with two or more nodes 110, 111, 112 in the wireless communications network 100. The method may comprise the following actions.

Action 301

The central node 101 selects a primary node of the two or more nodes 110, 111, 112 to transmit a positioning data packet to the device 121. This means, for example, that any of two or more nodes 110, 111, 112 may be either a primary or secondary node at different points in time, and that this may be controlled or governed by the central node 101. Advantageously, the control node 101 may thus select the most suitable of the two or more nodes 110, 111, 112 to be the primary node at a specific point in time. It follows that the remaining nodes of the two or more nodes 110, 111, 112 not selected to be the primary node, will be secondary nodes. In another embodiment the nodes 110, 111, 112 acts as a distributed control node and may this select the most suitable of the two or more nodes 110, 111, 112 to be the primary node at a specific point in time. In yet another embodiment a specific node is assigned the task of selecting the most suitable of the two or more nodes 110, 111, 112 to be the primary node at a specific point in time.

In some embodiments the node 110, 111, 112 that is closest to the device 121 is selected as the primary node. In some embodiments the node 110, 111, 112 with the lowest previous on air time is selected as the primary node. In another embodiment the node 110, 111, 112 with the best signal strength is selected as the primary node even if it is not geographically closest. In another embodiment the primary node is selected based on other criteria such as on air time, remaining battery, signal strength, or any other suitable criterion.

In some embodiments, the central node 101 may select a primary node based on the total time that each of the two or more nodes 110, 111, 112 has spent on transmitting positioning data packets to the device 121. This may be advantageously, for example, when there are regulatory requirements on the total air time, i.e. total time of transmissions occupying the radio frequency channel, that a node may be required to follow, since it allows the central node 101 to compare the accumulated air time of each of the two or more nodes 110, 111, 112 and control which of the two or more nodes 110, 111, 112 that is most suitable to transmit positioning data packet, i.e. which of the two or more nodes 110, 111, 112 to select to be the primary node. In some embodiments, the central node 101 may select another one of the two or more nodes 110, 111, 112 as the primary node for transmitting one or more positioning data packets to the device 121 in case the total time that a selected primary node 110 has spent on transmitting positioning data packets to the device 121 is passed a first determined threshold. Here, the total time that the another one of the two or more nodes 110, 111, 112 has spent on transmitting positioning data packets to the device 121 is passed a second determined threshold.

For example, in case there is a regulatory requirement that limits the air time of a node to e.g. 100 seconds, then the central node 101 may switch primary node from a currently selected primary node, e.g. the primary node 110, to another one of the two or more nodes, e.g. one of the secondary nodes 111, 112, in case the total air time of the currently selected primary node is above a first determined threshold e.g. 80 seconds, while the total air time of another one of the two or more nodes is below a second determined threshold of e.g. 50 seconds. It should be noted that this is merely one example and that any suitable thresholds or threshold limits may be determined by the central node 101.

Action 302

After the selection in Action 301, the central node 101 receives timing information from the two or more nodes 110, 111, 112 based on the positioning data packet transmitted by the selected primary node 110 and a request response from the device 121 to the positioning data packet transmitted by the selected primary node 110. Thus, the central node 101 may obtain and gather the timing information from each of the two or more nodes 110, 111, 112 in the wireless communications network 100 based on a single positioning data packet-request response exchange between the primary node 110 and the device 121. In some embodiments, the timing information may comprise determined transmitting times of the positioning data packet, reception times of the received request response, and/or determined transmission times in the two or more nodes 110, 111, 112.

Action 303

After the reception in Action 302, the central node 101 may determine the position of the device 121 based on the received timing information. This means that the central node 101 use the obtained and gathered timing information from each of the two or more nodes 110, 111, 112 in the wireless communications network 100 in order to determine the position of the device 121 in the wireless communications network 100.

According to some embodiments, the central node 101 may determine the position of the device 121 further based on that the processing time in the device 121 from the reception of the positioning data packet to the transmitting of the request response is set and determined in the central node 101. This means, for example, that the processing time in the device 121 may be assumed to be stable and constant in the central node 101. The processing time of the device 121 may, for example, be predefined, manually inputted or downloaded in the central node 101.

Figure 4:
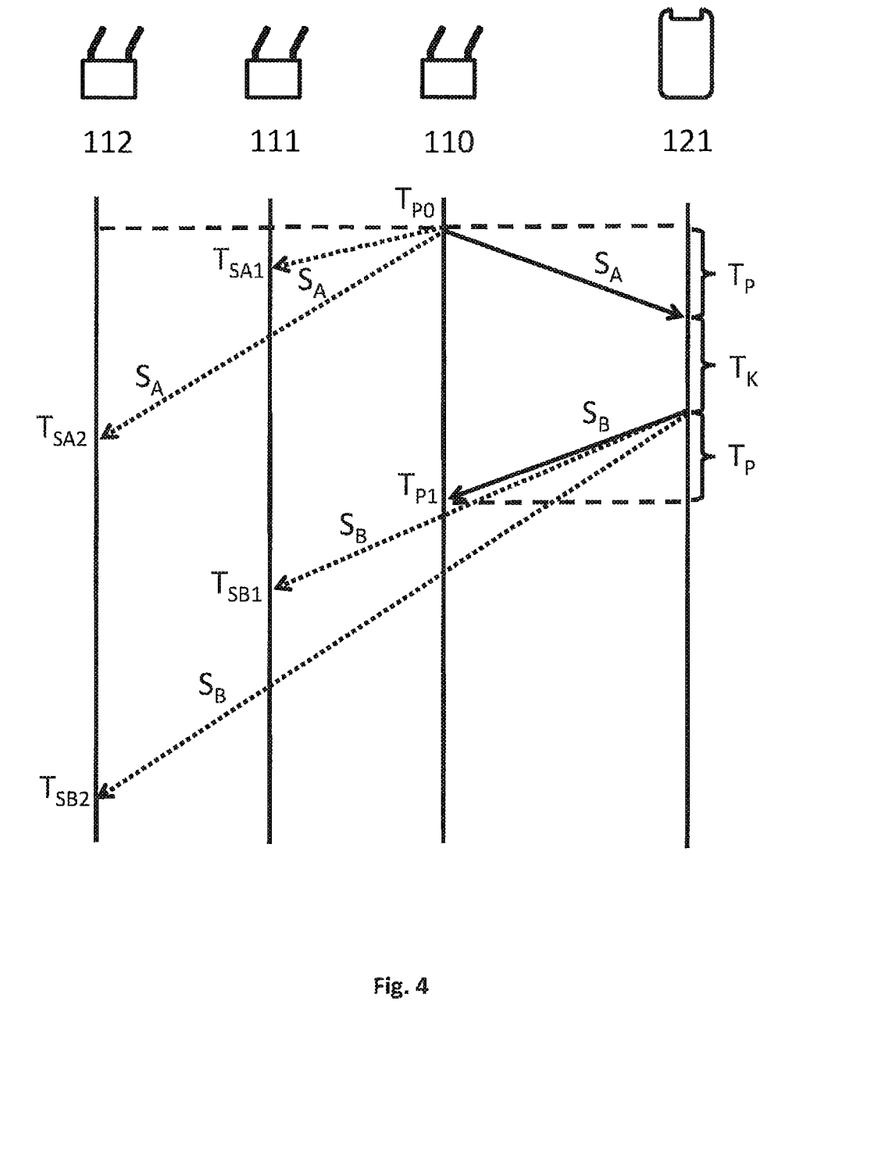
FIG. 4 is a signalling scheme depicting embodiments of a secondary node.

FIG. 4 shows a signalling scheme depicting an example of a signalling between the primary node 110, the secondary nodes 111, 112 and the device 121 according to embodiments described herein.

First, the primary node 110 transmits the positioning data packet SA at a time TP0 to the device 121. After a transmission time TP, the positioning data packet SA is received at the wireless device 121. Correspondingly, the positioning data packet SA is also received by the secondary node 111 at time TSA1 and received by the secondary node 112 at time TSA2. Since the secondary node 111 and the secondary node 112 knows its own position and the position of the primary node 110 between which there is a known relative time difference, the secondary node 111 and the secondary node 112 may determine the transmitting time TP0 of the positioning data packet SA at the primary node 110 based on the reception times TSA1 and TSA2, respectively.

After receiving the positioning data packet, the device 121 may process the positioning data packet during a processing time TK. The processing time TK in the device 121 may be designed to be stable and accurate enough in order for the nodes in the wireless communications network 110 to assumed it to be fixed and constant. For example, the processing time TK in the device 121 may be determined with an accuracy of below one or a few nano-second (ns).

After the processing time TK, the wireless device 121 may transmit a request response SB back to the primary node 110. After the transmission time TP, the request response SB is received by the primary node 110 at time TP1. Correspondingly, the request response SB is also received by the secondary node 111 at time TSB1 and received by the secondary node 112 at time TSB2, Since the secondary node 111 and the secondary node 112 has determined the transmitting time TP0 of the positioning data packet SA at the primary node 110, the secondary node 111 and the secondary node 112 may, for example, determine an RTT of the positioning data packet-request response exchange, albeit originating from the primary node 110. Other transmission times, such as, ToF and TDoA, may also be determined by the secondary node 111 and the secondary node 112 based on the positioning data packet-request response exchange between the primary node 110 and the device 121. This determined timing information may then be used in determining the distance between the device 121 and each of the primary node 110 and the secondary node 111, 112, which subsequently may be used in determining the position of the device 121 in the wireless communications network 100.

Figure 5:
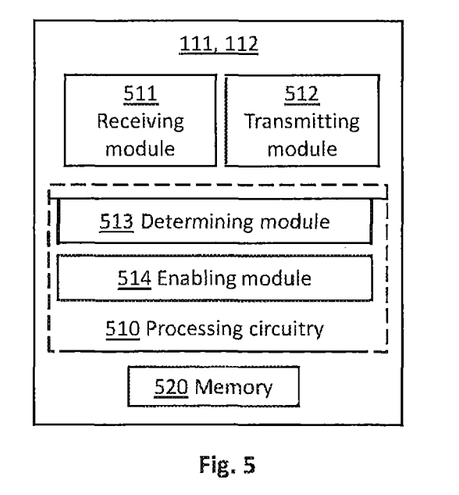
FIG. 5 is a schematic block diagram depicting embodiments of a secondary node.

To perform the method actions for enabling positioning of a device 121 in a wireless communications network 100, the secondary node 111, 112 may comprise the following arrangement depicted in FIG. 5. FIG. 5 shows a schematic block diagram of embodiments of the secondary node 111, 112.

The secondary node 111, 112 may comprise a processing circuitry 510, a memory 520 and at least one antenna (not shown). The secondary node 111, 112 may also comprise a receiving module 511 and a transmitting module 512. The receiving module 511 and the transmitting module 512 may comprise Radio Frequency, RF, circuitry and baseband processing circuitry. The receiving module 511 and the transmitting module 512 may also form part of a transceiver. The processor 510 may also be referred to as processing module, processing unit or processing circuitry. The receiving module 511 may also be referred to as a receiver or receiving unit, and the transmitting module 512 may also be referred to as transmitter or transmitting unit. In particular embodiments, some or all of the functionality described above as being performed by the secondary node 111, 112 may be provided by the processing circuitry 510 executing instructions stored on a computer-readable medium, such as, the memory 520 shown in FIG. 5. Embodiments of the secondary node 111, 112 may comprise additional components, such as, the determining module 513 and the enabling module 514, responsible for providing its functionality necessary to support the embodiments described herein.

The secondary node 111, 112 or processing circuitry 510 is configured to, or may comprise the receiving module 511 configured to, receive a positioning data packet from a primary node 110 to the device 121. Also, the secondary node 111, 112 or processing circuitry 510 is configured to, or may comprise the determining module 513 configured to, determine the transmitting time of the positioning data packet based on the reception time of the positioning data packet in the secondary node 111, 112 and the position of the primary node 110 and the secondary node 111, 112. Further, the secondary node 111, 112 or processing circuitry 510 is configured to, or may comprise the receiving module 511 configured to, receive a request response from the device 121 to the primary node 110. Furthermore, the secondary node 111, 112 or processing circuitry 510 is configured to, or may comprise the enabling module 514 configured to, enable positioning of the device 121 based on the determined transmitting time of the positioning data packet and the reception time of the received request response.

In some embodiments, the secondary node 111, 112 or processing circuitry 510 may be configured to, or may comprise the determining module 513 being configured to, determine the transmitting time based on the position of the primary node 110 and the secondary node 111, 112, wherein the position of the primary node 110 and the secondary node 111, 112 are at least temporarily stationary and determined in the secondary node 111, 112. Also, in some embodiments, the secondary node 111, 112 or processing circuitry 510 may be configured to, or may comprise the determining module 513 being configured to, determine a transmission time between the secondary node 111, 112 and the device 121 based on the determined transmitting time of the positioning data packet and the received reception time of the request response. In some embodiments, the secondary node 111, 112 or processing circuitry 510 may be configured to, or may comprise the transmitting module 512 configured to, transmit the determined transmitting time of the positioning data packet, the reception time of the received request response, and/or the determined transmission time to another node in the wireless communications network 100.

Further, in some embodiments, the secondary node 111, 112 or processing circuitry 510 may be configured to, or may comprise the receiving module 511 configured to, receive at least one transmission time between the device 121 and another node in the wireless communications network 100. In this case, the secondary node 111, 112 or processing circuitry 510 may be configured to, or may comprise the determining module 513 configured to, determine the position of the device 121 based on at least the received at least one transmission time and one or more of the determined transmitting time of the positioning data packet, the reception time of the received request response, and/or the determined transmission time.

The embodiments for enabling positioning of a device 121 in a wireless communications network 100 may be implemented through one or more processors, such as, e.g. the processor 510 in the secondary node 111, 112 depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processor 510 in the secondary node 111, 112. The computer program code may e.g. be provided as pure program code in the secondary node 111, 112 or on a server and downloaded to the secondary node 111, 112. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blu-ray disc, etc. From the above it may be seen that some embodiments may comprise a computer program product, comprising instructions which, when executed on at least one processor, e.g. the processor 510, cause the at least one processor to carry out the method for enabling positioning of a device 121 in a wireless communications network 100.

The secondary node 111, 112 may further comprise the memory 520, which may be referred to or comprise one or more memory modules or units. The memory 520 may be arranged to be used to store executable instructions and data to perform the methods described herein when being executed in or by the processor 510 of the secondary node 111, 112. Those skilled in the art will also appreciate that the processor 510 and the memory 520 described above may refer to a combination of analog and digital circuits, and/or one or more processors configured with software and/or firmware, e.g. stored in the memory 520, that when executed by the one or more processors, such as, the processor 510, cause the one or more processors to perform the method as described above. The processor 510 and the memory 520 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
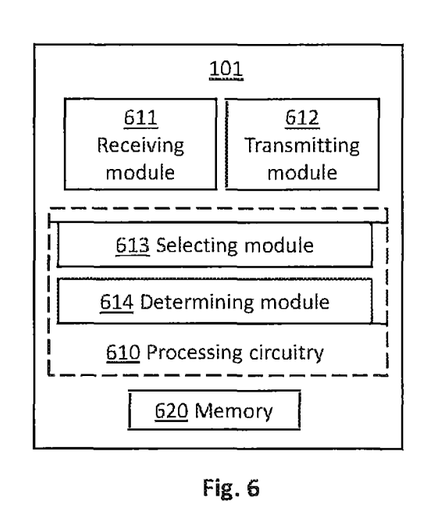
FIG. 6 is a schematic block diagram depicting embodiments of a central node.

To perform the method actions for positioning a device 121 in a wireless communications network 100, the central node 101 may comprise the following arrangement depicted in FIG. 6. FIG. 6 shows a schematic block diagram of embodiments of the central node 101.

The central node 101 may comprise a processing circuitry 610 and a memory 620. The central node 101 may further comprise a receiving module 611 and a transmitting module 612. The receiving module 611 and the transmitting module 612 may also form part of a transceiver. The processor 610 may also be referred to as processing module, processing unit or processing circuitry. The receiving module 611 may also be referred to as a receiver or receiving unit, and the transmitting module 612 may also be referred to as transmitter or transmitting unit. The central node 101 is configured to communicate with two or more nodes 110, 111, 112 in the wireless communications network 100, e.g. via the receiving module 611 and the transmitting module 612. In particular embodiments, some or all of the functionality described above as being performed by the secondary node 111, 112 may be provided by the processing circuitry 610 executing instructions stored on a computer-readable medium, such as, the memory 620 shown in FIG. 6. Embodiments of the central node 101 may comprise additional components, such as, the selecting module 613 and the determining module 614, responsible for providing its functionality necessary to support the embodiments described herein.

The central node 101 or processing circuitry 610 is configured to, or may comprise the selecting module 613 configured to, select a primary node of the two or more nodes 110, 111, 112 for transmitting one or more positioning data packets to the device 121. Also, the central node 101 or processing circuitry 610 is configured to, or may comprise the receiving module 611 configured to, receive two or more transmission times between the two or more nodes 110, 111, 112 and the device 121 based on the one or more positioning data packets transmitted by the selected primary node 110. Further, the central node 101 or processing circuitry 610 is configured to, or may comprise the determining module 614 configured to, determine the position of the device 121 based on at least the received two or more transmission times.

In some embodiments, the central node 101 or processing circuitry 610 may be configured to, or may comprise the selecting module 613 configured to, select the primary node based on the total time that each of the two or more nodes 110, 111, 112 has spent on transmitting positioning data packets to the device 121. In some embodiments, the central node 101 or processing circuitry 610 may be configured to, or may comprise the selecting module 613 configured to, select another one of the two or more nodes 110, 111, 112 as the primary node for transmitting one or more positioning data packets to the device 121 in case the total time that a selected primary node 110 has spent on transmitting positioning data packets to the device 121 is passed a first determined threshold. In this case, according to some embodiments, the total time that said another one of the two or more nodes 110, 111, 112 has spent on transmitting positioning data packets to the device 121 is passed a second determined threshold.

The embodiments for positioning a device 121 in a wireless communications network 100 may be implemented through one or more processors, such as, e.g. the processor 610 in the central node 101 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processor 610 in the central node 101. The computer program code may e.g. be provided as pure program code in the central node 101 or on a server and downloaded to the central node 101. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blu-ray disc, etc. From the above it may be seen that some embodiments may comprise a computer program product, comprising instructions which, when executed on at least one processor, e.g. the processor 810, cause the at least one processor to carry out the method for positioning a device 121 in a wireless communications network 100.

The network node 110 may further comprise the memory 620, which may be referred to or comprise one or more memory modules or units. The memory 620 may be arranged to be used to store executable instructions and data to perform the methods described herein when being executed in or by the processor 610 of the central node 101. Those skilled in the art will also appreciate that the processor 610 and the memory 620 described above may refer to a combination of analog and digital circuits, and/or one or more processors configured with software and/or firmware, e.g. stored in the memory 620, that when executed by the one or more processors, such as, the processor 610, cause the one or more processors to perform the method as described above. The processor 610 and the memory 620 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SOC).

The terminology used in the detailed description of the particular embodiments illustrated in the accompanying drawings is not intended to be limiting of the described wireless device 121, network node 110 and methods therein which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a secondary node for enabling positioning of a device in a wireless communications network, the method comprising:
   receiving a positioning data packet request from a primary node to the device;
   determining the transmitting time of the positioning data packet request based on the reception time of the positioning data packet request in the secondary node and the position of the primary node and the secondary node;
   receiving a request response from the device to the primary node; and
   enabling positioning of the device based on the determined transmitting time of the positioning data packet request and the reception time of the received request response.

2. The method according to claim 1, wherein the position of the primary node and the secondary node are at least temporarily stationary.

3. The method according to claim 1, wherein the enabling further comprises determining a transmission time between the secondary node and the device based on the determined transmitting time of the positioning data packet request and the received reception time of the request response.

4. The method according to claim 1, wherein the enabling further comprises transmitting the determined transmitting time of the positioning data packet request, the reception time of the received request response, and/or the determined transmission time to another node in the wireless communications network.

5. The method according to claim 1, wherein the enabling further comprises receiving at least one transmission time between the device and another node in the wireless communications network, and determining the position of the device based on at least the received at least one transmission time and one or more of the determined transmitting time of the positioning data packet request, the reception time of the received request response, and/or the determined transmission time.

6. The method according to claim 5, wherein determining the position of the device is further based on that the processing time in the device from the reception of the positioning data packet request to the transmitting of the request response is set and/or determined in the secondary node.

7. The method according to claim 1, wherein the reception of the positioning data packet request and the request response is performed within an Industrial, Scientific and Medical (ISM) radio band and/or on a frequency between 300 MHz to 1000 MHz.

8. A non-transitory computer program product, comprising instructions which, when executed on at least one processor, cause the at least one processor to carry out the method according to claim 1.

9. A carrier containing the non-transitory computer program product according to claim 8, wherein the carrier is a non-transitory computer-readable storage medium.

10. An apparatus comprising a secondary node for enabling positioning of a device in a wireless communications network, the secondary node being configured to;
receive a positioning data packet request from a primary node to the device;
determine the transmitting time of the positioning data packet request based on the reception time of the positioning data packet request in the secondary node and the position of the primary node and the secondary node;
receive a request response from the device to the primary node; and
enable positioning of the device based on the determined transmitting time of the positioning data packet request and the reception time of the received request response.

11. The apparatus according to claim 10, wherein the secondary node is further configured to determine the transmitting time based on the position of the primary node and the secondary node, wherein the position of the primary node and the secondary node are at least temporarily stationary and determined in the secondary node.

12. The apparatus according to claim 10, wherein the secondary node is further configured to determine a transmission time between the secondary node and the device based on the determined transmitting time of the positioning data packet request and the received reception time of the request response.

13. The apparatus according to claim 10, wherein the secondary node is further configured to transmit the determined transmitting time of the positioning data packet request, the reception time of the received request response, and/or the determined transmission time to another node in the wireless communications network.

14. The apparatus according to claim 10, wherein the secondary node is further configured to receive at least one transmission time between the device and another node in the wireless communications network, and determine the position of the device based on at least the received at least one transmission time and one or more of the determined transmitting time of the positioning data packet request, the reception time of the received request response, and/or the determined transmission time.

15. The apparatus according to claim 10, further comprising a processor and a memory, wherein the memory is containing instructions executable by the processor.

16. A wireless communications system comprising at least one secondary node according to claim 10 and at least one central node, said central node for positioning a device in a wireless communications network, and being configured to:
communicate with two or more nodes in the wireless communications network;
select a primary node of the two or more nodes for transmitting one or more positioning data packets to the device;
receive two or more transmission times between the two or more nodes and the device based on the one or more positioning data packets transmitted by the selected primary node; and
determine the position of the device based on at least the received two or more transmission times.

17. A method performed by a central node for positioning a device in a wireless communications network, the central node in communication with two or more nodes in the wireless communications network, the method comprising:
selecting a primary node of the two or more nodes to transmit a positioning data packet request to the device;
receiving timing information from the two or more nodes based on the positioning data packet transmitted by the selected primary node and a request response from the device to the positioning data packet request transmitted by the selected primary node; and
determining the position of the device based on the received timing information.

18. The method according to claim 17, wherein the timing information comprises at least one of: determined transmitting times of the positioning data packet, reception times of the received request response, and determined transmission times in the two or more nodes.

19. The method according to claim 17, comprising determining a processing time in the device from the reception of the positioning data packet to the transmission of the request response.

20. The method according to claim 17, wherein the selecting is based on the total time that each of the two or more nodes has spent on transmitting positioning data packets to the device.

21. The method according to claim 20, further comprising, when the total time that a selected primary node has spent on transmitting positioning data packets to the device is past a first determined threshold, selecting another one of the two or more nodes as the primary node for transmitting one or more positioning data packets to the device, wherein the total time that said another one of the two or more nodes has spent on transmitting positioning data packets to the device is past a second determined threshold.

22. An apparatus comprising a central node for positioning a device in a wireless communications network, the central node being configured to,
communicate with two or more nodes in the wireless communications network;
select a primary node of the two or more nodes for transmitting one or more positioning data packets to the device;
receive two or more transmission times between the two or more nodes and the device based on the one or more positioning data packets transmitted by the selected primary node; and determine the position of the device based on at least the received two or more transmission times.

23. The apparatus according to claim 22, wherein the central node is further configured to select the primary node based on the total time that each of the two or more nodes has spent on transmitting positioning data packets to the device.

24. The apparatus according to claim 23, wherein the central node is further configured to, when the total time that a selected primary node has spent on transmitting positioning data packets to the device is passed a first determined threshold, select another one of the two or more nodes as the primary node for transmitting one or more positioning data packets to the device, wherein the total time that said another one of the two or more nodes has spent on transmitting positioning data packets to the device is passed a second determined threshold.

25. The apparatus according to claim 22, further comprising a processor and a memory, wherein the memory is containing instructions executable by the processor.

* * * * *